US 12,491,761 B2

(12) United States Patent
Hahn et al.

(10) Patent No.: US 12,491,761 B2
(45) Date of Patent: Dec. 9, 2025

(54) HYBRID DRIVE UNIT

(71) Applicant: MERCEDES-BENZ GROUP AG, Stuttgart (DE)

(72) Inventors: Peter Hahn, Stuttgart (DE); Carsten Gitt, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 323 days.

(21) Appl. No.: 18/039,006

(22) PCT Filed: Oct. 15, 2021

(86) PCT No.: PCT/EP2021/078583
§ 371 (c)(1),
(2) Date: May 26, 2023

(87) PCT Pub. No.: WO2022/111910
PCT Pub. Date: Jun. 2, 2022

(65) Prior Publication Data
US 2023/0415562 A1      Dec. 28, 2023

(30) Foreign Application Priority Data
Nov. 30, 2020   (DE) ............... 10 2020 007 298.4

(51) Int. Cl.
*B60K 6/48*        (2007.10)
*B60K 6/36*        (2007.10)
(Continued)

(52) U.S. Cl.
CPC .............. *B60K 6/48* (2013.01); *B60K 6/36* (2013.01); *B60K 6/387* (2013.01); *B60K 6/40* (2013.01);
(Continued)

(58) Field of Classification Search
CPC .. B60K 6/48; B60K 6/36; B60K 6/387; B60K 6/40; B60K 6/547; B60K 2006/268;
(Continued)

(56) References Cited

U.S. PATENT DOCUMENTS 9,003,907 B2    4/2015  Weller et al.
10,252,608 B2 * 4/2019  Liu ........................ B60K 6/26
(Continued)

FOREIGN PATENT DOCUMENTS

DE      102012009484 B3    9/2013
DE      102013210013 A1    12/2014
(Continued)

OTHER PUBLICATIONS

International Search Report and Written Opinion mailed Jan. 4, 2022 in related/corresponding International Application No. PCT/EP2021/078583.

(Continued)

*Primary Examiner* — John D Walters
(74) *Attorney, Agent, or Firm* — PATENT PORTFOLIO BUILDERS PLLC

(57) ABSTRACT

A hybrid drive unit includes a transmission having an input shaft and first and second countershafts. An internal combustion engine is directly couplable to the input shaft via a clutch. There are seven shiftable gear pairings, each including a gearwheel arranged coaxially to the input shaft. The first gear pairing has a first gearwheel formed as an idler gear and arranged coaxially to the input shaft, and a second gearwheel formed as an idler gear and arranged coaxially to the first countershaft. The electric machine is connected to the first gear pairing such that torques are transmittable from the electric machine to the transmission via the first gear pairing. Viewed in an axial direction, the first shiftable gear pairing, a first shifting element plane, the second shiftable (Continued)

Figure 1:
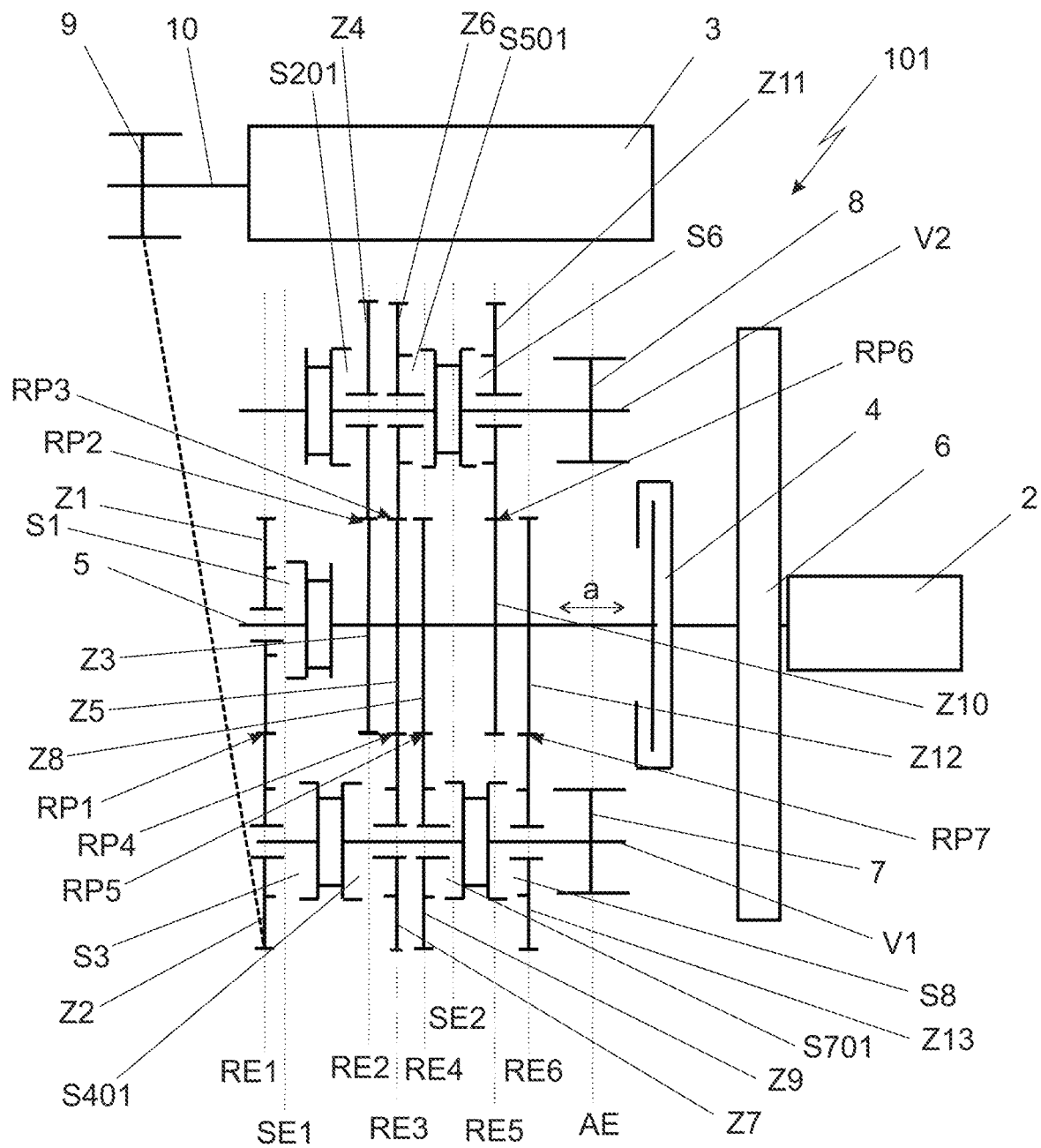

gear pairing, the third shiftable gear pairing, the fifth shiftable gear pairing, a second shifting element plane, the sixth shiftable gear pairing, and the seventh shiftable gear pairing are arranged one behind the other in that order. The third and the fourth shiftable gear pairings are arranged on the same axial gear plane.

10 Claims, 4 Drawing Sheets

(51) Int. Cl.
| | | |
|---|---|---|
| *B60K 6/387* | (2007.10) | |
| *B60K 6/40* | (2007.10) | |
| *B60K 6/547* | (2007.10) | |
| *F16H 3/093* | (2006.01) | |
| *B60K 6/26* | (2007.10) | |

(52) U.S. Cl.
CPC ............ *B60K 6/547* (2013.01); *F16H 3/093* (2013.01); *B60K 2006/268* (2013.01); *B60K 2006/4808* (2013.01); *B60K 2006/4825* (2013.01); *B60K 2006/4833* (2013.01); *F16H 2003/0931* (2013.01); *F16H 2200/0056* (2013.01)

(58) Field of Classification Search
CPC .... B60K 2006/4808; B60K 2006/4825; B60K 2006/4833; F16H 3/093; F16H 2003/0931; F16H 2200/0056
See application file for complete search history.

(56) References Cited

U.S. PATENT DOCUMENTS

| | | | |
|---|---|---|---|
| 2015/0211607 A1* | 7/2015 | Nakashima | B60K 6/48 74/661 |
| 2017/0305258 A1 | 10/2017 | Liu et al. | |

FOREIGN PATENT DOCUMENTS

| | | |
|---|---|---|
| DE | 102016013477 A1 | 5/2017 |
| DE | 102017112868 B3 | 9/2018 |
| EP | 1008782 A1 | 6/2000 |
| EP | 2902236 A1 | 8/2015 |
| FR | 2859141 A1 | 3/2005 |
| JP | 2014054900 A | 3/2014 |
| KR | 20120043347 A | 5/2012 |

OTHER PUBLICATIONS

Office Action created Feb. 6, 2023 in related/corresponding DE Application No. 10 2020 007 298.4.
Office Action created May 17, 2021 in related/corresponding DE Application No. 10 2020 007 298.4.

* cited by examiner

HYBRID DRIVE UNIT

BACKGROUND AND SUMMARY OF THE INVENTION

Exemplary embodiments of the invention relate to a hybrid drive unit, having an internal combustion engine, an electric machine, and a transmission.

Hybrid drive units are known from DE 10 2012 009 484 B3, FR 2 859 141 A1, DE 10 2017 112 868 B3, US 2017/0 305 258 A1, and DE 10 2016 013 477 A1.

Furthermore, DE 10 2013 210 013 A1, for example, describes such a hybrid drive unit with which the electric machine can be connected both to the input shaft of the transmission, but on the side of a clutch facing away from the internal combustion engine, which is also commonly referred to as a P2 connection, and to a countershaft serving as the output shaft, which in turn is referred to as a P3 connection. The structure has four gear planes for four individual gears. The electric machine is connected to two idler gears on the input shaft, which in turn form a gear pairing with a further idler gear on the countershaft. The electric machine can thus be alternatively coupled to the input shaft of the transmission or its countershaft or output shaft in the manner described above.

The structure is relatively large in relation to the possible number of gear steps, especially in the axial direction, i.e., in the direction running along the input shaft of the transmission.

Exemplary embodiments of the present invention are directed to an improved hybrid drive unit that is highly compact, especially in the axial direction, and that is also capable of shifting in hybrid mode without a complete interruption of traction force.

In addition to the internal combustion engine, the hybrid drive unit comprises an electric machine and a transmission. The transmission comprises an input shaft and at least two countershafts. Seven shiftable gear pairings are provided, each with a gearwheel arranged coaxially to the input shaft. For the purposes according to the invention, a gear pairing means two gearwheels in mesh, wherein one of which is arranged coaxially to the input shaft and the other of which is arranged coaxially to one of the countershafts. The two gearwheels of the gear pairing are arranged on a gear plane perpendicular to the axis of rotation of the input shaft. In the hybrid drive unit according to the invention, a first of the gear pairings comprises two idler gears, one on the input shaft and one on the first countershaft. The electric machine is connected to such first gear pairing in such a way that torques can be transmitted from the electric machine to the transmission via the first gear pairing. The design of the first gear pairing using two idler gears allows both a P2 connection and a P3 connection.

Furthermore, seen in an axial direction, which here is always in relation to the axis of rotation of the input shaft, the first shiftable gear pairing, a first shifting element plane, the second shiftable gear pairing, the third shiftable gear pairing, the fifth shiftable gear pairing, a second shifting element plane, the sixth shiftable gear pairing, and the seventh shiftable gear pairing are arranged one behind the other in that order, wherein the third and the fourth shiftable gear pairings are arranged on the same axial gear plane. A shifting element is to be understood as a device provided for the rotationally-fixed connection of an idler gear of a gear pairing with its shaft carrying it, wherein the shifting element comprises at least a sliding sleeve and a dog clutch toothing along with, in an advantageous embodiment, furthermore, a synchronizing device. Two adjacent shifting elements arranged coaxially to one another may advantageously share one and the same sliding sleeve. Here, a shifting element plane is a plane arranged perpendicular to the axis of rotation of the input shaft and intersects at least two shifting elements, wherein the at least two shifting elements are arranged coaxially to different shafts, wherein the shafts are understood to be the input shaft, the first countershaft, and the second countershaft. The fact that a shifting element plane "comprises" a shifting element means that such shifting element plane intersects at least a part of such shifting element. Similarly, an output gear plane is a plane perpendicular to the axis of rotation of the input shaft, which comprises the output gears arranged in a rotationally-fixed manner on the countershafts. Within the meaning of the invention, a rotationally-fixed connection means that the elements connected in this way are arranged coaxially to one another and rotate at the same angular velocity or rotational speed.

The hybrid drive unit according to the invention with seven gear steps thus uses a clever arrangement of the gear planes and the shifting element planes together with a dual gear plane for a highly compact structure, especially in the axial direction. Here, a dual gear plane designates a plane perpendicular to the axial direction in which two gear pairings, which share a gearwheel, are arranged. The special gear set architecture makes it possible to build the transmission in the hybrid drive unit according to the invention at very low cost. In addition, despite the simple structure, full functionality and a high level of comfort are provided during gear shifts; in particular, gear shifts can be made without interrupting the traction force.

In accordance with an exceptionally favorable further development of the invention, the first gear pairing is arranged along the input shaft in the last gear plane as viewed from the clutch, wherein the electric machine overlaps the clutch in the axial direction.

Axial direction means the direction of the axis of rotation of the input shaft. Here, the overlapping arrangement within the meaning of the invention means that the elements may lie in the same axial plane or, preferably, project axially into the same axial plane. Axial plane means a plane perpendicular to the axis of rotation of the input shaft.

The hybrid drive unit according to the invention can preferably dispense with a clutch that is capable of starting the engine and, in particular, also with a mechanical reverse gear. This allows the diameter of the clutch to be designed to be correspondingly small such that it can be arranged in a space-saving manner overlapping the electric machine and, according to an exceptionally favorable further development, also overlapping the two output gears on the two countershafts.

In a hybrid vehicle with the hybrid drive unit according to the invention, it is then possible for it to be used together with another purely electrically-driven axle to drive an axle driven via the hybrid drive unit. Starting operations along with a reverse drive can then be realized purely electrically with one or also both electric machines, i.e., that of the hybrid drive unit according to the invention and that of the further purely electrically-driven axle. Gear shifts within the transmission can be made without load interruption in the case of drive via the internal combustion engine or the internal combustion engine and the electric machine, in that the electric machine in the P3 connection compensates for or supports the rotational speeds and torques accordingly during the gear shift.

The particular gear set architecture of the hybrid drive unit according to the invention can further provide that the first gear pairing comprise a first gearwheel arranged coaxially to the input shaft and a second gearwheel arranged coaxially to the first countershaft, the third gear pairing comprise a fifth gearwheel arranged coaxially to the input shaft and a sixth gearwheel arranged coaxially to the second countershaft, and the fourth gear pairing comprise a seventh gearwheel arranged coaxially to the input shaft and an eighth gearwheel arranged coaxially to the first countershaft.

This arrangement contributes to the above-mentioned advantages, in particular, if, according to a further highly favorable embodiment of the invention, it is additionally provided that the first shifting element plane comprise at least a third shifting element arranged coaxially to the first countershaft and a first shifting element arranged coaxially to the input shaft, and that the second shifting element plane comprise at least a sixth shifting element arranged coaxially to the second countershaft and a seventh shifting element arranged coaxially to the first countershaft.

As a further advantageous addition to such embodiment, it can then also be provided that the first shifting element be provided for a rotationally-fixed connection of the first gearwheel to the input shaft, the third shifting element be provided for a rotationally-fixed connection of the second gearwheel to the first countershaft, the fourth shifting element be provided for a rotationally-fixed connection of the seventh gearwheel to the first countershaft, and the fifth shifting element be provided for a rotationally-fixed connection of the sixth gearwheel to the second countershaft.

Preferably, the fourth shifting element and the third shifting element and/or the first shifting element and the second shifting element can each be formed as shifting elements with a common sliding sleeve. This makes the transmission even more favorable in terms of actuator technology and even more compact in its structure.

A highly favorable embodiment of the hybrid drive unit according to the invention can further provide that the seventh gear pairing form an associated pure gear plane. A pure gear plane is defined as a plane perpendicular to the axis of rotation of the input shaft that intersects only a gear pairing, but not a shifting element. This also contributes to the compact design.

A highly advantageous further development of the hybrid drive unit according to the invention can further provide that the fifth and sixth gear planes each comprise a fixed wheel coaxial to the input shaft. The idler gear of the corresponding gear pairing in such gear planes, which then serves as the output gear, is then coaxial to one of the countershafts, and the other idler gear is coaxial to the other one of the countershafts. Here, it is essentially irrelevant which one is located on the first and the second countershaft, since in both cases the free installation space on the respective other one of the countershafts in the fifth gear plane can then be used by a shifting element in order to support the compact axial structure.

A further advantageous variant of the hybrid drive unit according to the invention can also provide that in each case a gearwheel of the third gear plane, i.e., the dual gear plane, and a gearwheel of the second gear plane or the fourth gear plane be arranged coaxially to one of the countershafts and, specifically, directly adjacent to one another. Directly adjacent means an arrangement in which no shifting element and no other gearwheel is arranged on the same shaft between the two directly adjacent elements. The arrangement according to this embodiment allows the installation space for shifting elements on the countershaft to be used alternately in such a way that they can be positioned in a highly space-saving manner—in particular, with a common sliding sleeve—in relation to further adjacent shifting elements or gearwheels.

According to a further highly favorable variant of the hybrid drive unit according to the invention, it can also be provided that a further shifting element plane be formed in the axial direction between the first shifting element plane and the second gear plane. Such further shifting element plane, which could also be referred to as the third shifting element plane, comprises the second shifting element and the fourth shifting element, wherein the fourth shifting element is arranged coaxially to the one of the countershafts, and the second shifting element is arranged coaxially to the input shaft.

Further advantageous embodiments and further developments of the hybrid drive unit according to the invention also result from the exemplary embodiments, which are shown in more detail below with reference to the figures.

BRIEF DESCRIPTION OF THE DRAWING FIGURES

Figure 2:
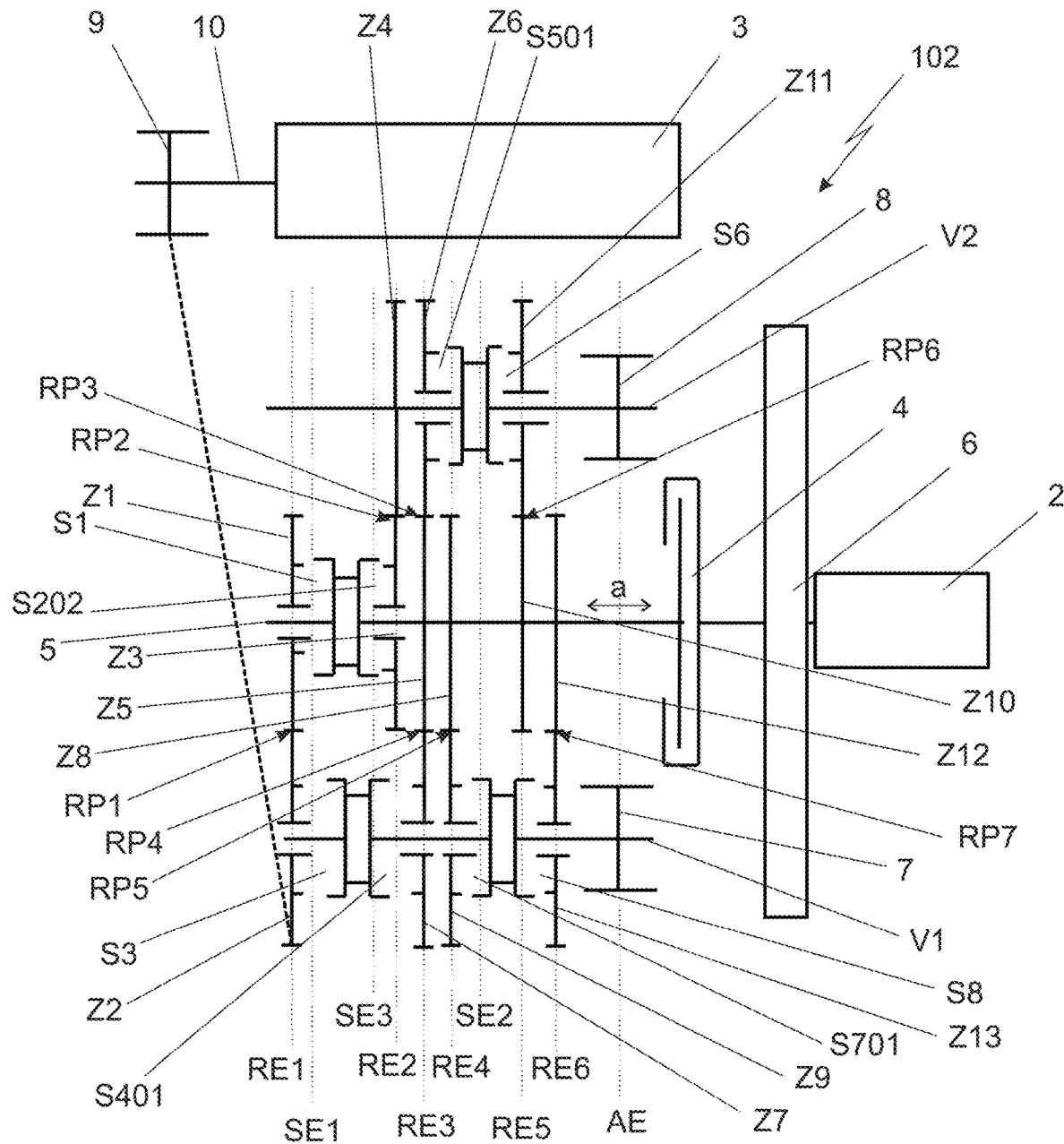
Figure 3:
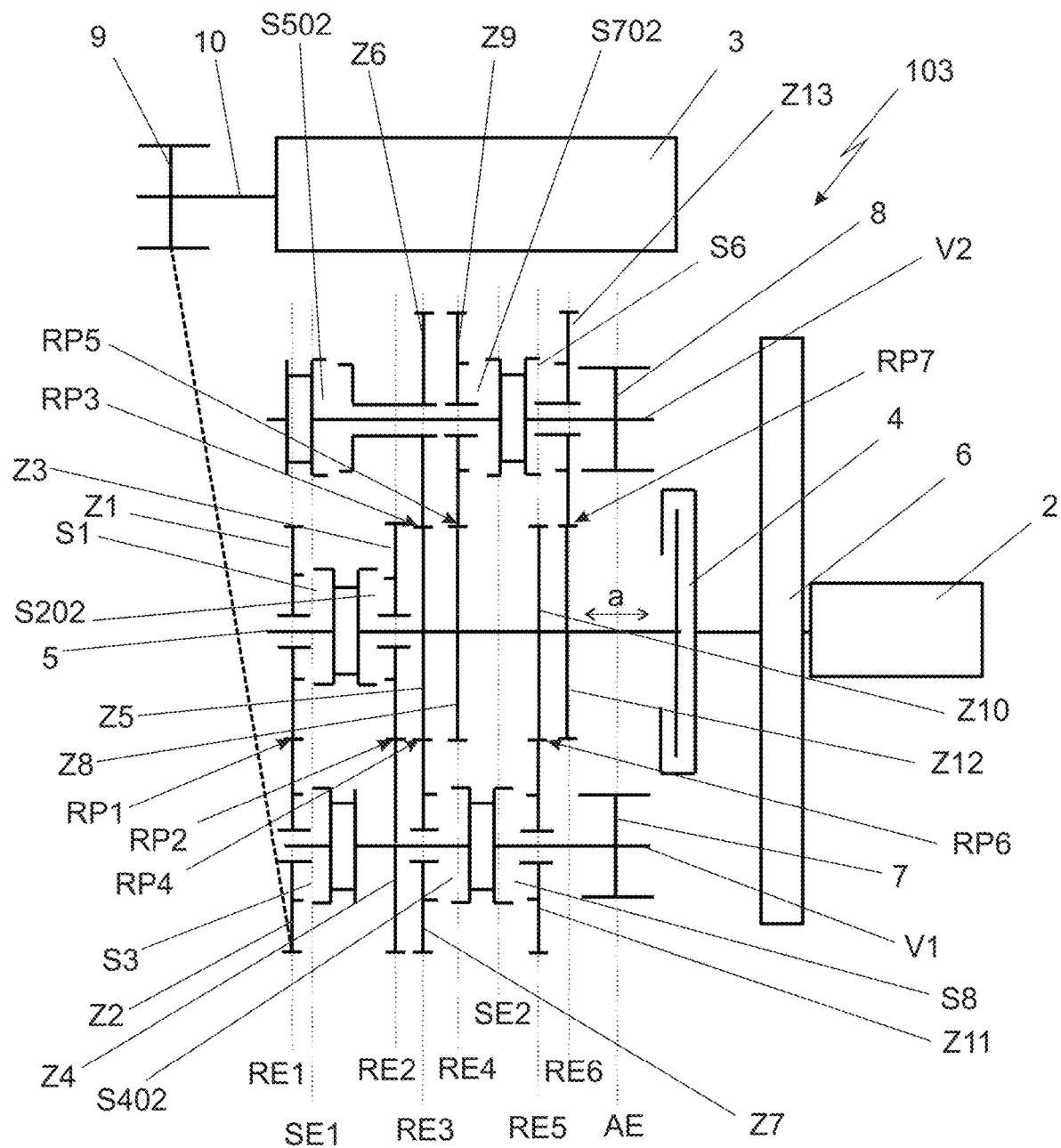
Figure 4:
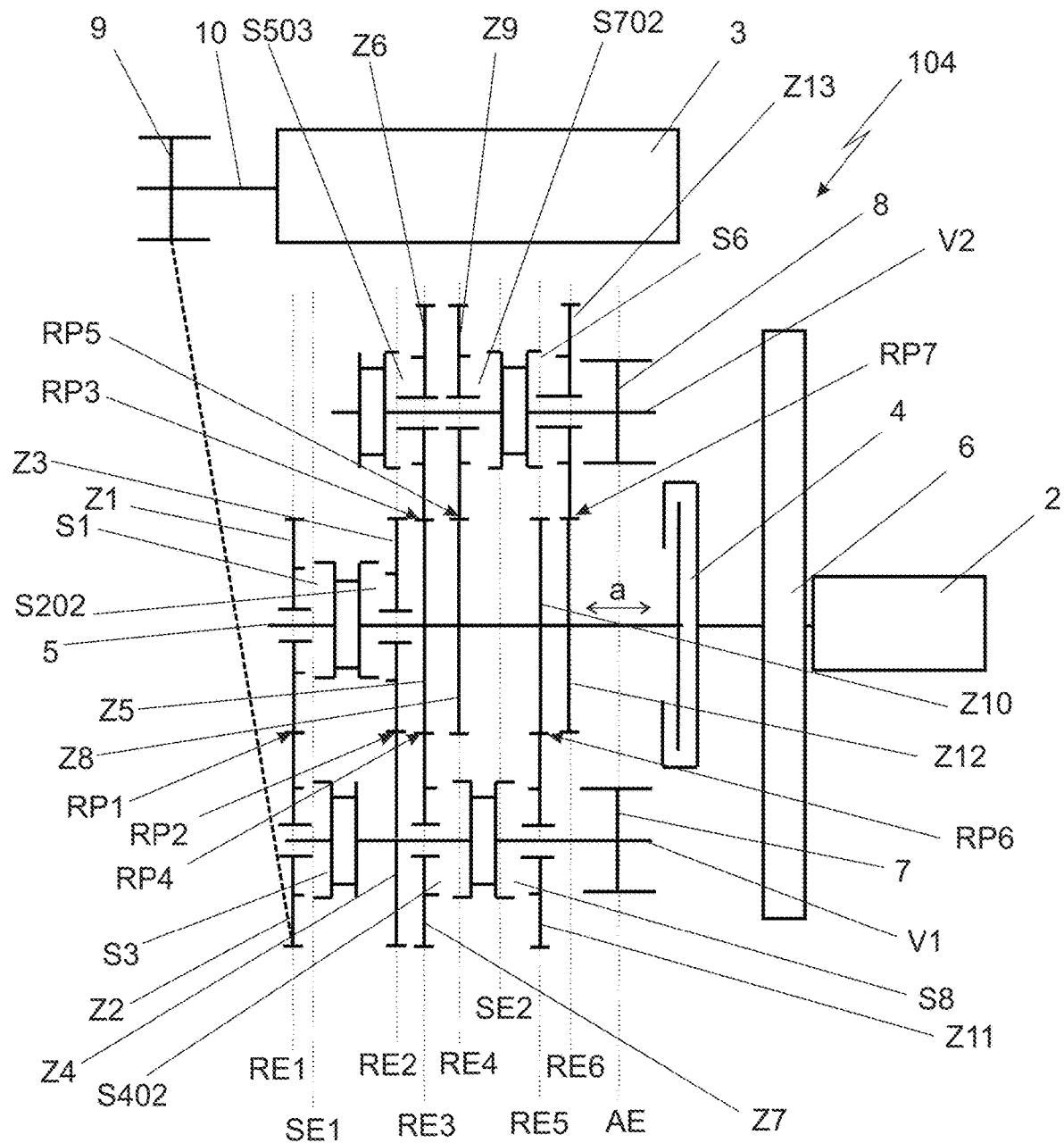

The following are shown:

FIG. 1 a first possible variant of the hybrid drive unit according to the invention;

FIG. 2 a second possible variant of the hybrid drive unit according to the invention;

FIG. 3 a third possible variant of the hybrid drive unit according to the invention; and FIG. 4 a fourth possible variant of the hybrid drive unit according to the invention.

DETAILED DESCRIPTION

In the figures, a hybrid drive unit 101, 102, 103, 104 is schematically shown in each case in a possible structure according to the invention. The gear set diagrams, which serve to illustrate the 7-gear transmission installed therein, are not to be understood as being to scale, nor are all the components necessarily in the plane of the page in which they are shown. Moreover, the dimensions of the components shown do not have to correspond to the real structure.

FIG. 1 shows a first variant of the hybrid drive unit 101, which comprises an internal combustion engine 2, on the one hand, and an electric machine 3, on the other. The internal combustion engine 2 is directly connected to an input shaft 5 of a transmission of the hybrid drive unit 1 via a clutch 4. Here, the direct connection can optionally comprise a device 6 for the absorption and/or damping of torsional vibrations, e.g., a dual-mass flywheel, between a crankshaft of the internal combustion engine 2 and the clutch 4, such that "direct" is to be understood here in such a way that no further transmission elements such as clutches, gear ratios, or the like are arranged between the crankshaft of the internal combustion engine 2 and the clutch 4.

In the axial direction a of the axis of rotation of the input shaft 5, seven gear pairings follow as viewed from the clutch 4, viz., a first shiftable gear pairing RP1 up to a seventh shiftable gear pairing RP7. Such seven gear pairings RP1 through RP7 share six gear planes, viz., a first gear plane RE1 up to a sixth gear plane RE6. In the hybrid drive unit 101, five gearwheels formed as fixed gears, viz., a third gearwheel Z3, a fifth gearwheel Z5, an eighth gearwheel Z8, a tenth gearwheel Z10, and a twelfth gearwheel Z12, are arranged on the input shaft 5, along with a first gearwheel Z1 with an associated first shifting element S1 in the last arranged gear plane—here, the first gear plane RE1—as viewed from the clutch 4 in the axial direction a. Two countershafts, viz., a first countershaft V1 and a second countershaft V2, are arranged in each case parallel to the input shaft 5. Both countershafts V1, V2 have output gears 7, 8 in an output gear plane E, which in turn mesh, for example, with a differential gear (not shown), viz., an input gearwheel of a differential transmission, directly or via at least one intermediate gear element. A first output gear 7 of the output gears 7, 8 is connected to the first countershaft V1 in a rotationally-fixed manner, and a second output gear 8 of the output gears 7, 8 is connected to the second countershaft V2 in a rotationally-fixed manner.

The first gear pairing RP1 is the last gear pairing RP1 in the axial direction a as viewed from the clutch 4 and is therefore arranged on the last gear plane RE1 as viewed in such direction. It comprises the first gearwheel Z1, which is formed as an idler gear on the input shaft 5, and a second gearwheel Z2, which is also formed as an idler gear and is arranged coaxially to the first countershaft V1. As already mentioned, the first gearwheel Z1 can be connected to the input shaft 5 in a rotationally-fixed manner via the first shifting element S1, and the second gearwheel Z2 can be connected to the first countershaft V1 via a third shifting element S3 in a rotationally-fixed manner, if required. The electric machine 3 is then connected to the first gear pairing RP1 via a pinion 9, which is connected in a rotationally-fixed manner to a rotor shaft 10 of the electric machine 3. For this purpose, the pinion 9 meshes with the second gearwheel Z2 of the first gear pairing RP1, as indicated by the dashed line in the illustration of FIG. 1. Alternatively, the pinion 9 can also mesh with the first gearwheel Z1. Advantageously, an intermediate gear or intermediate shaft is arranged between the pinion 9 and the respective gearwheel Z2, Z1.

This allows torque from the electric machine 3 to be introduced into the transmission. Depending upon the position of the shifting elements S1, S3, a so-called P2 connection can be realized, with which the electric machine 3 acts upon the input shaft 5 via the pinion 9 and the second gearwheel Z2 of the first gear pairing RP1 rotating loosely on the first countershaft V1 and the first gearwheel Z1 coupled to the input shaft 5 via the first shifting element S1, viz., on the side of the clutch 4 facing away from the internal combustion engine 2. Depending upon the shift position within the transmission, output then occurs via the first countershaft V1 and its first output gear 7 or the second countershaft V2 and its second output gear 8.

Alternatively, the structure is switched to a so-called P3 connection in which, with the first shifting element S1 open and the first gearwheel Z1 rotating accordingly on the input shaft 5, and the second gearwheel Z2 of the first gear pairing PR1 coupled to the first countershaft V1 via the third shifting element S3, the first countershaft V1 and thus its first output gear 7 is driven directly.

When the transmission is in neutral, i.e., when none of the idler gears are coupled, the electric machine 3 can be used to start the internal combustion engine 2, or the internal combustion engine 2 drives the electric machine 3 as a generator.

The electric machine 3 is arranged to overlap the clutch 4 in the axial direction a. This enables an exceptionally compact structure, with which the electric machine 3 ensures an exceptionally compact structure due to the connection to the last gear plane, viz., to the first gear plane RE1, in the axial direction a as viewed from the clutch 4 and its simultaneous axial overlapping of the clutch 4, i.e., projecting into the plane of the clutch 4 that is perpendicular to the axial direction a. Alternatively, and not shown in the figures, the clutch 4 could also be formed to overlap with the output gears 7, 8 in the axial direction a, i.e., it would project into the output gear plane AE. This is possible in particular if the clutch 4 is formed as a clutch 4 that cannot start the engine, since its diameter can then be selected to be sufficiently small for such an arrangement. Due to the hybridization of the hybrid drive unit 101 and also of the variants 102, 103, and 104 shown below, this is not problematic, since the start-up process can be easily realized via the electric machine 3 even if the clutch 4 is not capable of starting the engine.

In the axial direction a—this time from the first gear plane RE1 with the first gear pairing RP1 in the direction of the clutch 4—the first gear pairing RP1 is followed by the second gear pairing RP2 with the third gearwheel Z3, which is formed as a fixed gear on the input shaft 5. Here, a fourth gearwheel Z4 on the second countershaft V2 forms the further gearwheel of the second gear pairing RP2, i.e., its output gear. This fourth gearwheel Z4, which is formed as an idler gear, can be coupled to the second countershaft V2 via a second shifting element S201, if required. The third gear plane RE3 then follows in the axial direction after the second gear plane RE2. It comprises a fifth gearwheel Z5 formed coaxially on the input shaft 5 as a fixed gear. This meshes in the third gear pairing RP3 with a sixth gearwheel Z6 as an idler gear on the second countershaft V2, shiftable with a fifth shifting element S501. In such third gear plane RE3, which is formed as a dual gear plane, there is then also the fourth gear pairing RP4, which is formed from a combination of the fifth gearwheel Z5, which is formed as a fixed gear, and a seventh gearwheel Z7, which is formed as an idler gear, on the first countershaft V1. Via a fourth shifting element S401, which can be shifted with the third shifting element S3 via a common sliding sleeve, such seventh gearwheel Z7 can be connected to the first countershaft V1 in a rotationally-fixed manner, if required. Following such third gear plane RE3, which is formed as a dual gear plane, there is then a fourth gear plane RE4, which is formed with an eighth gearwheel Z8 as a fixed gear on the input shaft 5 and a ninth gearwheel Z9 formed as an idler gear on the first countershaft V1. The associated seventh shifting element S701 can connect the ninth gearwheel 9 to the first countershaft V1 in a rotationally-fixed manner, if required. The two gearwheels Z8 and Z9 form the fifth gear pairing RP5.

The sixth gear pairing RP6 is then formed on the axially adjacent fifth gear plane RE5. It comprises a tenth gearwheel Z10, which is formed as a fixed gear on the input shaft 5, and an eleventh gearwheel Z11, which is formed as an idler gear on the second countershaft V2. A sixth shifting element S6 assigned to it can be actuated together with the fifth shifting element S501, in turn with a jointly used sliding sleeve.

The first gear plane RE1 and the sixth gear plane RE 6 form so-called pure gear planes in such structure of the drive unit 101. There is no shifting element in such gear plane, only gearwheels. In the seventh gear pairing RP7, these are the twelfth gearwheel Z12 and the thirteenth gearwheel Z13. The twelfth gearwheel Z12 is formed as a fixed gear on the input shaft 5, and the thirteenth gearwheel Z13 as an idler gear on the first countershaft V1. If required, it can be connected to such countershaft V1 in a rotationally-fixed manner via an eighth shifting element S8.

This sixth gear plane RE6 is then followed by the output gear plane AE already mentioned above, in which at least the two output gears 7, 8 of the countershafts V1, V2 are located, and in which in particular—but without this being shown here—the clutch 4 can also be arranged. The electric machine 3 overlaps such output gear plane AE along with the clutch 4 in the axial direction a.

Between the gear planes RE1 and RE2, there is then a first shifting element plane SE1 with the third shifting element S3 arranged coaxially to the first countershaft V1 and the first shifting element S1 arranged coaxially to the input shaft 5. A second shifting element plane SE2 is located between the fourth gear plane RE4 and the fifth gear plane RE5 and comprises the seventh shifting element S701 along with the sixth shifting element S6, while the fourth shifting element S401 is arranged on the second gear plane RE2, and the fifth shifting element S501 is arranged on the fourth gear plane RE4, and the eighth shifting element S8 is arranged on the fifth gear plane RE5. Here, the transmission of the hybrid drive unit 1 can be designed to be used as a seven-gear transmission without a mechanical reverse gear. In particular, reversing is thus performed via the electric machine 3. This can also be used for start-up in order to get by with a correspondingly small clutch 4, which in this case does not have to be capable of starting the engine, as already mentioned.

The first gear plane RE1, the fourth gear plane RE4, and the sixth gear plane RE6 have their respective gear pairings RP1, RP5, and RP7 from the input shaft 5 to the first countershaft V1, the second gear pairing RP2 in the second gear plane RE2, and the sixth gear pairing RP6 in the fifth gear plane RE5 to the other countershaft V2. The dual gear plane in the third gear plane RE3 translates, for example, the sixth and seventh gear steps to both countershafts V1, V2.

The gear ratios may be formed in such a way that the first gear is realized via the sixth gear pairing RP6 in the fifth gear plane RE5, the second gear via the fifth gear pairing RP5 in the fourth gear plane RE4, the third gear via the first gear pairing RP1 in the first gear plane RE1, and the fourth or fifth gear alternately via the second gear pairing RP2 in the second gear plane RE2 or via the seventh gear pairing RP7 in the sixth gear plane RE6. The sixth and the seventh gears could then each be realized via the dual gear plane RE3—for example, the sixth gear via the third gear pairing RP3 and the seventh gear via the fourth gear pairing RP4.

An alternative to the arrangement of the gear ratio just described could also be, in the case of continued dual use of the dual gear plane RE3 for the sixth and the seventh gear, to realize the fourth gear via the first gear pairing RP1 in the first gear plane RE1 and to use the second gear pairing RP2 in the second gear plane RE2 for the second, third, or fifth gear, the fifth gear pairing RP5 in the fourth gear plane RE4 for the first or second gear, and the sixth gear pairing RP6 in the fifth gear plane RE5 for the first, second, or third gear. Accordingly, the seventh gear pairing RP7 in the gear plane RE6 would then have to be used alternately for gears one, two, three, or five.

A specific exemplary embodiment of this could, for example, provide for the first gear to be implemented via the sixth gear pairing RP6 in the fifth gear plane RE5, the second gear via the fifth gear pairing RP5 in the fourth gear plane RE4, the third gear via the seventh gear pairing RP7 in the gear plane RE6, the fourth gear via the first gear pairing RP1 in the first gear plane RE1, the fifth gear via the second gear pairing RP2 in the second gear plane RE2, and the sixth gear and the seventh gear via the gear pairings RP3 and RP4 of the dual gear plane RE3—for example, the sixth gear via the third gear pairing RP3 and the seventh gear via the fourth gear pairing RP4.

In the illustration of FIG. 2, an alternative variant of the hybrid drive unit 102 is shown. The difference, on the one hand, is that the second shifting element switches from the second countershaft V2 to the input shaft 5 and is now designated S202. Thus, the second gear pairing RP2 now has a third gearwheel Z3 as an idler gear instead of the fixed gear on the input shaft 5, and accordingly the fourth gearwheel Z4 as a fixed gear coaxial to the second countershaft V2. In this embodiment, the first shifting element S1 and the second shifting element S202 can now be formed as a type of dual shifting element with a common sliding sleeve, as can the third shifting element S3 and the fourth shifting element S401, which was also the case previously. This saves effort in terms of control and actuator technology. With this embodiment, a further shifting element plane SE3 is created, which is inserted between the first shifting element plane SE1 and the second gear plane RE2 in the order described at the beginning. The further structure of the hybrid drive unit 102 is analogous to the previously described structure of the hybrid drive unit 101 of the preceding figure.

The use of the individual gear pairings RP1 through RP7 and of the corresponding gear planes RE1 through RE6 for the corresponding gear ratios may in turn also be implemented in this embodiment of the hybrid drive unit 102 in a manner analogous to the embodiment of the hybrid drive unit 101 in FIG. 1. Here as well, the dual gear plane RE3 with its two gear pairings RP3 and RP4 can thus be used for the sixth and seventh gear steps. The further gear planes RE1 through RE6 and gear pairings RP1 through RP7 are once again possible, analogously to the embodiment 101 from FIG. 1 already described above. In the hybrid drive unit 102, both of the above-described options for the gear ratios can be used in an analogous manner, just as in the specific exemplary embodiment.

In the variant 103 of the hybrid drive unit 103 shown in FIG. 3, it is the case that the second gear pairing RP2 no longer outputs towards the second countershaft V2, but towards the first countershaft V1. The dual gear plane RE3 with the gear pairings RP3 and RP4 then follows, as before. In the fourth gear plane RE4, the structure is then reversed. Instead of driving via the fifth gear pairing RP5 to the first countershaft V1 as before, the output switches here to the second countershaft V2. The same also applies to the two further gear pairings RP6 and RP7, which also output to the respective other countershafts V1, V2 than in the previous variants of the hybrid drive unit 101, 102. The previous fourth shifting element accordingly moves in the axial direction of the first countershaft V1 to the other side of the dual gear plane and is now designated here S402. The seventh shifting element moves from the first to the second countershaft and is now accordingly designated S702 here. The shifting elements S6 and S8 remain largely in place, but are displaced accordingly in the axial direction along the countershafts as a result of the new structure.

Another aspect relates to the fifth shifting element S501 for a rotationally-fixed connection of the sixth gearwheel Z6 of the third gear pairing RP3, which is formed as an idler gear, to the second countershaft V2. It moves to the other side of the gearwheel Z6 in the axial direction and is displaced axially into the first shifting element plane SE1 in the exemplary embodiment shown here.

This variant of the hybrid drive unit 103 now enables the dual use of the dual gear plane RE3 with the gear pairings RP3 and RP4 for the fifth and sixth gears. For example, the structure can have gear ratios such that the fifth gear pairing RP5 in the fourth gear plane RE4 and alternately the sixth gear pairing RP6 in the fifth gear plane RE5 provide gears one and two. The third gear can again be realized via the first gear pairing RP1. The fourth gear and the seventh gear can be realized alternately either via the second gear pairing RP2 or the seventh gear pairing RP7, while the fifth gear and the sixth gear are implemented via the two gear pairings RP3 and RP4 of the dual gear plane RE3.

In the illustration of FIG. 4, a further variant of the hybrid drive unit 104 is shown. Such variant of the hybrid drive unit 104 differs from the variant of the hybrid drive unit 103 described above only in that the fifth shifting element designated S502 in the variant 103, which was arranged there in the first shifting element plane SE1, is now designated as the fifth shifting element 503 and is arranged in a position axially displaced into the second gear plane RE2 on the second countershaft V2. Apart from that, the structure corresponds to that of the previously described variant.

The gears in such variant of the hybrid drive unit 104 could now be realized, for example, such that the sixth gear pairing RP6 in the gear plane RE5 and the fifth gear pairing RP5 in the fourth gear plane RE4 alternately form the first or second gear, while the second gear pairing RP2 in the second gear plane RE2 and the seventh gear pairing RP7 in the sixth gear plane RE6 alternately form gears three and seven. The first gear pairing RP1 on the first gear plane RE1 could then be used to realize the fourth gear, while the two gear pairings RP3 and RP4 on the gear plane RE3, which is used as a dual gear plane, could form the fifth and sixth gears.

All variants of the hybrid drive unit 101, 102, 103, 104 according to FIGS. 1 through 4 enable seven gears to be realized without a mechanical reverse gear. The hybrid drive unit 101, 102, 103, 104 can preferably be used to drive a first driven axle of a vehicle in which a second driven axle is driven purely electrically. The vehicle could then, in principle, have further driven or non-driven axles, wherein the structure as a passenger car typically provides for two axles. Such a hybrid passenger car is the preferred, but not exclusive, use of the hybrid drive unit 101, 102, 103, 104.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A hybrid drive unit, comprising:
an internal combustion engine;
an electric machine; and
a transmission,
wherein the transmission has an input shaft and at least a first countershaft and a second countershaft,
wherein the internal combustion engine directly couplable to the input shaft via a clutch,
wherein the transmission includes seven shiftable gear pairings, which include a first shiftable gear pairing, a second shiftable gear pairing, a third shiftable gear pairing, a fourth shiftable gear pairing, a fifth shiftable gear pairing, a sixth shiftable gear pairing, and a seventh shiftable gear pairing, each of the shiftable gear pairings having a gearwheel arranged coaxially to the input shaft,
wherein the first gear pairing has a first gearwheel configured as an idler gear and arranged coaxially to the input shaft, and a second gearwheel configured as an idler gear and arranged coaxially to the first countershaft,
wherein the electric machine is connected to the first gear pairing in such a way that torques are transmittable from the electric machine to the transmission via the first gear pairing,
wherein, viewed in an axial direction, the first shiftable gear pairing, a first shifting element plane, the second shiftable gear pairing, the third shiftable gear pairing, the fifth shiftable gear pairing, a second shifting element plane, the sixth shiftable gear pairing, and the seventh shiftable gear pairing are arranged one behind the other in that order,
wherein the third and the fourth shiftable gear pairings are arranged on a same axial gear plane, and
wherein the first gear pairing is arranged on a last gear plane in the axial direction and as viewed from the clutch, wherein the electric machine is arranged axially overlapping the clutch.

2. The hybrid drive unit of claim 1, wherein the third gear pairing comprises a fifth gearwheel arranged coaxially to the input shaft and a sixth gearwheel arranged coaxially to the second countershaft, and wherein the fourth gear pairing comprises the fifth gearwheel arranged coaxially to the input shaft and a seventh gearwheel arranged coaxially to the first countershaft.

3. The hybrid drive unit of claim 2, wherein the first shifting element plane comprises at least a third shifting element arranged coaxially to the first countershaft and a first shifting element arranged coaxially to the input shaft, and wherein the second shifting element plane comprises at least a sixth shifting element arranged coaxially to the second countershaft and a seventh shifting element arranged coaxially to the first countershaft.

4. The hybrid drive unit of claim 3, wherein the first shifting element is configured for a rotationally-fixed connection of the first gearwheel to the input shaft, the third shifting element is configured for a rotationally-fixed connection of the second gearwheel to the first countershaft, the fourth shifting element is configured for a rotationally-fixed connection of the seventh gearwheel to the first countershaft, and the fifth shifting element is configured for a rotationally-fixed connection of the sixth gearwheel to the second countershaft.

5. The hybrid drive unit of claim 4, wherein
the third shifting element and the fourth shifting element are shifting elements with a common sliding sleeve, or
the first shifting element and the second shifting element are shifting elements with a common sliding sleeve.

6. The hybrid drive unit of claim 1, wherein the seventh gear pairing forms a pure gear plane.

7. The hybrid drive unit of claim 1, wherein the fifth and the sixth gear planes each comprise a fixed wheel coaxial to the input shaft, wherein an idler gear of one of the fifth and the sixth gear planes is formed coaxially to one of the first and second countershafts, and an idler gear of the other one of the fifth and sixth gear planes is formed coaxially to the other one of the first and second countershafts.

8. The hybrid drive unit of claim 1, wherein, in each case, a gearwheel of the third gear plane and a gearwheel of the second gear plane or of the fourth gear plane are arranged coaxially to one of the first and second countershafts and directly adjacent to one another, wherein a further gearwheel of the third gear plane and a gearwheel of the fourth gear plane or of the second gear plane are arranged coaxially to the other one of the first and second countershafts and directly adjacent to one another.

9. The hybrid drive unit of claim 1, wherein a further shifting element plane, which comprises the second shifting element and the fourth shifting element, is formed in the axial direction between the first shifting element plane and the second gear plane, wherein the fourth shifting element is arranged coaxially to one of the first and second countershafts, and the second shifting element is arranged coaxially to the input shaft.

10. The hybrid drive unit of claim 1, wherein the clutch is arranged in a manner axially overlapping a first output gear connected in a rotationally-fixed manner to the first countershaft and in a manner axially overlapping a second output gear connected in a rotationally-fixed manner to the second countershaft.

* * * * *